United States Patent [19]
Lee

[11] Patent Number: 6,130,877
[45] Date of Patent: Oct. 10, 2000

[54] RATE CONTROLLED BROADCAST FOR ACTIVATION OF ENTITIES IN LARGE SCALE DATA NETWORKS

[75] Inventor: Peter Chi-Kin Lee, Nepean, Canada

[73] Assignee: Nortel Networks Corporation, Montreal, Canada

[21] Appl. No.: 08/862,302

[22] Filed: May 23, 1997

[51] Int. Cl.[7] .................. H04J 1/16; H04J 3/26; H04L 12/56; G01R 31/08
[52] U.S. Cl. ................ 370/229; 370/390; 370/432
[58] Field of Search ................ 370/351, 389, 370/390, 399, 400, 401, 409, 432; 709/233, 234, 229

[56] References Cited

U.S. PATENT DOCUMENTS

| | | | |
|---|---|---|---|
| 5,245,607 | 9/1993 | Caram | 370/390 |
| 5,402,415 | 3/1995 | Turner | 370/390 |
| 5,835,482 | 11/1998 | Allen | 370/40 |

*Primary Examiner*—Michael Horabik
*Assistant Examiner*—Kevin C. Harper
*Attorney, Agent, or Firm*—John A. Granchelli; C. W. Junkin

[57] ABSTRACT

A broadcast methodology for activation of virtual circuits in a large scale data network at a controlled rate is disclosed. The method includes, at a node within the network, alternate steps of broadcasting activation signals for a predetermined number of the of virtual circuits and delaying a time interval. The alternate steps are repeated until all the activation signals have been broadcast.

14 Claims, 4 Drawing Sheets

```
Bool FrsFrameRelayInterfaceHandlerBase_Actor::continueBroadcast (Uint32 event)
    {
        /* broadcast the event set by setupBroadcast()         */
        /* to the next n DLCIs,                                */
        /* rerun the broadcast if there are more than n DLCIs */ extern Uint32 frsContBroadcast_g;

Uint32 n = 0;
        uint32 bdelaymsec = 300;
        uint32 bcnt;
        Uint32 brate        =300;     // 10 per brate millseconds
        AsdDlciTableListEntryBase * dlcTableEntryPtr;

// slow start algorithm - keep card with lots of DLCI's on lots
        // of FRS's from broadcasting too fast
        bcnt = frsBroadcastRerunLimit_c;
        if (contBroadcastState == contBcastFirst_c)
        {
            contBroadcastState = contBcastCont_c;
            bcnt                =0;
        }
        while (n < bcnt)
        {
            if ((dlcTableEntryPtr = (AsdDlciTableListEntryBase *)
                    broadcastIterator.nextEntry()) !=
                        (AsdDlciTableListEntryBase *) null_c)
            {
                invokeDlcHandler(dlcTableEntryPtr->dlciActor_pm,
                    (RTSignal)event);
                n++;
            }
            else
            {  // decr num of frs porcesses in broadcast
                frsContBroadcast_g --;
                contBroadcastState = contBcastNull_c;
                return (False) ;
            }
        } // end of while // brate is set for broadcast rate of 1000 dlci's per 30 secs bdelaymsec = brate * frsContBroadcast_g;
        if (bdelaymsec > brate * 120)    bdelaymsec = brate * 120;
        if (bdelaymsec < brate)          bdelaymsec = brate;

contBroadcastTimer.start_v   // start delay timer to slow broadcast
            (FrsPortCommonBase: : frInternalMsgPortFn_c,
                                bdelaymsec,
                                frsFriBroadcastRerun);
        return (True) ;
    }
```

FIG. 4

RATE CONTROLLED BROADCAST FOR ACTIVATION OF ENTITIES IN LARGE SCALE DATA NETWORKS

FIELD OF THE INVENTION

The present invention generally relates to data communications networks and, in particular, to a broadcast methodology for activation of network entities in a large scale data network at a controlled rate.

BACKGROUND OF THE INVENTION

With respect to data communications, as represented in FIG. 1, a data network 10 may be generally characterized by a plurality of nodes 12 interconnected, for example, by trunks 14 and/or by virtual circuits 16 through which two nodes are communicatively coupled, whereby data is transferred between the nodes 12 of the network 10. The nodes 12 embody processors which effect various functions within the network 10. Certain nodes 12 may be provisioned with links 18 each of which functions as a data communications service access line, typically used by customer premise equipment (not shown) to access the data network 10. Frame Relay Services carrying data between network nodes 12 manifested by Nortel's Magellan Passport product is an example of conventional data communications.

Data networks 10 have evolved rapidly in the last few years, for instance, increasing by a 2 or 3 order of magnitude in both the speed of data transfer (e.g., from 9600 bits/second to 50 megabits/second) and the number of virtual circuits 16 that are present in such networks (e.g., from 500 to 500,000 or higher). As a consequence, technical problems need to be solved in order to create reliable data networks 10 that are so much faster and higher in complexity, from the technology base of earlier, smaller networks.

A significant problem is the amount of processing demands on the network nodes 12 to supervise and control the state of a large number of network entities, such as, the trunks 14, virtual circuits (VCs) 16 and corresponding data link connection identifiers (DLCIs) paired with each VC, links 18 (i.e. access lines), and the like.

Network speeds are much faster. As the volume of control messages is relatively low in comparison to activity each can produce, with respect to high speed networks, demands on a single node 12 for control of large amounts of network entities seem to arrive instantaneously at the network node 12 which may not have sufficient processing resources or capacity to process the large number of demands, thereby overloading that node.

The various nodes 12 in the data network 10 have no easy means to communicate with each other in relation to the large numbers of network entities which require supervision. Also, modern software practices typically implement each network entity in software as an object, that act independently of other objects, even in the same processor. Furthermore, all demands on load typically are generated as quickly as possible because, according to conventional wisdom, it is preferred to have the network 10 react as quickly as possible to network affecting events.

Network events can occur that trigger supervisory activities on large numbers of the network entities. These activities typically are initiated in response to some event occurring within the data communications network 10 in respect of a particular node and that node in turn may broadcast respective control messages for the network entities affected by the event, to one or more other nodes. Examples of possible network events include:

activation or outage of a data communications service containing a large number of DLCIs and corresponding VCs 16, for example, a link 18 which previously was not functioning now becoming operational or the link 18 which previously was functioning now becoming non-operational;

disconnection of the trunks 14 connecting a network node 10 to other node and its subsequent restoration; and reset of a network node 12 that handles a large number of network entities and its subsequent restoration.

Such events can easily produce very large demands, in terms of processing resources, on different nodes 12 in the network 10. If not handled properly, overloading of these nodes can either cause failure in the restoration of the required activity, for example, by the activity taking so long that it exceeds the time-out values for replies or in extreme cases, failure of other nodes 12 by exhaustion of memory or queue resources on those nodes.

Since such drastic actions are usually triggered by initial errors, this instantaneous large resource demand, referred to herein as tidal waves, makes required stability of data networks—the ability to keep operating and the ability to recover from failures—difficult to achieve. For example, initial failure of a particular network node 12 can produce tidal waves though the network 10, which waves then cause other network nodes 12 to fail, thereby resulting in complete paralysis of the entire network 10.

Therefore, measures need to be taken to safeguard large data networks from such drastic failures.

A direct approach to prevent tidal waves is for network nodes 12 that are low in resources to inform other nodes. Such congestion messages should cause the potential originator node 12 in the generation of a tidal wave to slow down and prevent tidal waves that are damaging. However, technology to monitor and inform on resource utilization, especially on a fast and transient basis, does not exist in standard form across the data network 10. The overloading can occur so fast that messages to ask the originator node 12 to slow down can easily be too late. Also, since there are so many network entities, such resource backing messages can easily themselves cause tidal waves if each network entity is responsible for checking resources.

If some supervisory entities (a smaller number of entities) in a network node are responsible, then it is very costly for that supervisor to find exactly which of the numerous entities are responsible for resource exhaustion and to ask them to desist. The complexity of any such system is very high, and it is very costly to produce and to verify their correct operation.

Another approach to prevent tidal waves is for any generating network node to query the receiver network node and make sure that it receives a proceed signal before starting the activity that involves the numerous network entities. This approach generates traffic and resource demand in itself, during times when the data network may be severely stressed, and may thus itself be a destablizing factor. Since there are numerous network entities that are independent of each other, the cost of such an authorization system will be as costly to network resources as the original activity. A query has to be sent to authorize each transaction. Such a system will slow down significantly the speed within which the needs of the numerous network entities are serviced. Large amounts of complexity is introduced to handle cases where proceed signals are not acknowledged. The sender will have to go through its lists of network entities and try again several times.

Hence, a methodology that prevents generation of tidal waves within a data communications network is desired.

SUMMARY OF THE INVENTION

It is an object of the present invention to provide a new and improved broadcast methodology for use in data communications networks.

The invention, therefore, according to a first broad aspect provides in a data communications network, a method of broadcasting signals from one node to a plurality of nodes comprising alternate steps of, at the one node: broadcasting the signals to a portion of the plurality of nodes; and delaying a predetermined time interval; whereby the alternate steps are repeated until the signals have been broadcast to all of the plurality of nodes.

In accordance with a second broad aspect of the invention, there is provided in a data communications network, a method of broadcasting signals comprising the steps of: recognizing occurrence of an event at a node; determining network entities which are affected by the recognized event; and broadcasting, by the node, related event signals corresponding to the recognized event to the affected network entities substantially at a controlled rate.

In accordance with a third broad aspect of the invention, there is provided a method for slowing down activation of a plurality of virtual circuits by a node in a data communications network, comprising alternate steps of: broadcasting activation signals for a predetermined number of the plurality of virtual circuits; and delaying a time interval; whereby the alternate steps are repeated until all the activation signals have been broadcast.

In accordance with a fourth broad aspect of the invention, there is provided in a data communications network, a method for activating of a plurality of virtual circuits by a network node providing communications service access to the network, comprising alternate steps of: broadcasting, by a communications service access process executed at the network node, activation signals to a number of connection identifier processes associated with the virtual circuits, the connection identifier processes providing the activation signals to corresponding virtual circuit processes which send activation messages through the network; and delaying a time interval; whereby the alternate steps are repeated until activation signals for all of the plurality of virtual circuits have been broadcast.

In accordance with a fifth broad aspect of the invention, there is provided in a data communications network, a system of broadcasting signals from one node to a plurality of nodes comprising: means for broadcasting the signals to a portion of the plurality of nodes; and means for delaying a predetermined time interval; whereby the means for broadcasting and the means for delaying operate alternately and repeatedly until the signals have been broadcast to all of the plurality of nodes.

In accordance with a sixth broad aspect of the invention, there is provided in a data communications network, a system for broadcasting signals comprising: means for recognizing occurrence of an event at a node; means for determining network entities which are affected by the recognized event; and means for broadcasting, by the node, related event signals corresponding to the recognized event to the affected network entities substantially at a controlled rate.

In accordance with a seventh broad aspect of the invention, there is provided a system for slowing down activation of a plurality of virtual circuits by a node in a data communications network, comprising: means for broadcasting activation signals for a predetermined number of the plurality of virtual circuits; and means for delaying a time interval; whereby the means for broadcasting and the means for delaying operate alternately and repeatedly until all the activation signals have been broadcast.

In accordance with a eight broad aspect of the invention, there is provided in a data communications network, a system for activating of a plurality of virtual circuits by a network node providing communications service access to the network, comprising: means for broadcasting, by a communications service access process executed at the network node, activation signals to a number of connection identifier processes associated with the virtual circuits, the connection identifier processes providing the activation signals to corresponding virtual circuit processes which send activation messages through the network; and means for delaying a time interval; whereby the means for broadcasting and the means for delaying operate alternately and repeatedly until activation signals for all of the plurality of virtual circuits have been broadcast.

To prevent the building of large tidal waves, each network node, when generating loads for other network processors, preferably slows themselves down to a not exceed a maximum rate, independently of the state of other processors.

This independent process removes most of the complexities and pitfalls of active systems in the large network to try to prevent tidal waves. No further data is generated to remove faults that can themselves become tidal waves. Each network node does not need instantaneous knowledge of the state of other network nodes.

When network events occur that would otherwise result in the generation of tidal waves, this slowing down of the generation of the load transforms the potential tidal waves into a smooth flow, the rate of which is controlled.

This approach attempts to ensure that failures or other events in a single network node alone will not generate sufficient activities that will congest remote network nodes, because the tidal wave is tamed to a smooth flow.

The predetermined rate of generation of broadcast loads on remote processors, preferably, can be set so that by itself, a node will not overload any remote processor even in the worst case. By doing this, destructive tidal waves may be prevented from originating by any single node affected by some event, such as, node failure. Typically, not all of the numerous network entities correspond to a single remote processor and thus this rate should provide a comfortable margin of safety. However, for extra margins of safety, at the cost of a longer restoration time for network failures or a longer time for networks to change its configuration, the predetermined rate may be slowed down further so that double or triple network node failures will not cause flows large enough to cause further harm to the network.

Since no active interaction occurs between network nodes during broadcast, this method can be verified and the speed determined by looking only at one generating node set at maximum size such that it is set up to direct all its load to a single remote node. That is the worst case condition for the test, and any network interaction will be less strenuous than that amount.

BRIEF DESCRIPTION OF THE DRAWINGS

The invention will be better understood from the following description, together with reference to the accompanying drawings in which:

FIG. 4 is a code fragment illustrating an exemplary implementation of the slowdown process.

DETAILED DESCRIPTION

Figure 1:
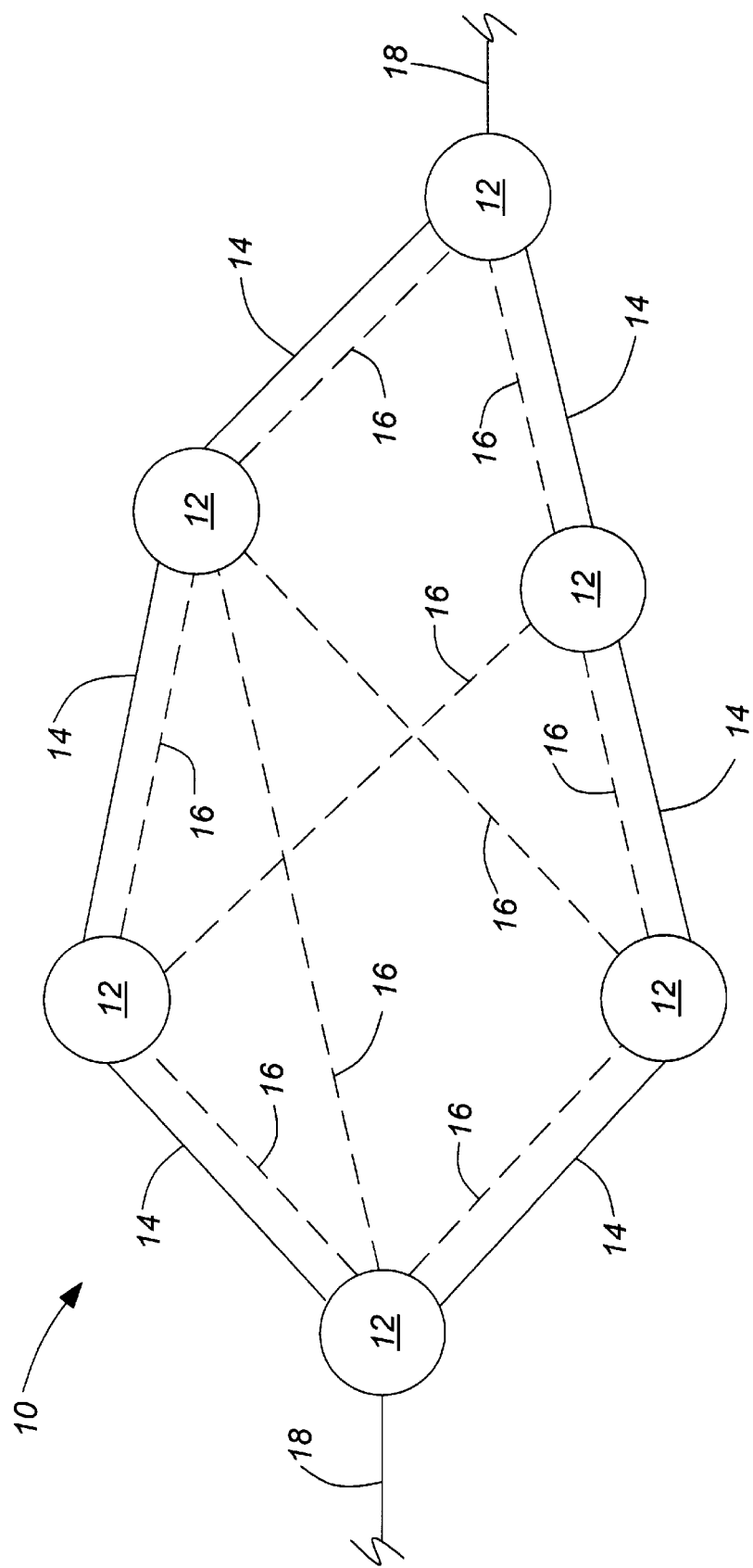
FIG. 1 is a schematic representation of a data communications network.
Figure 2:
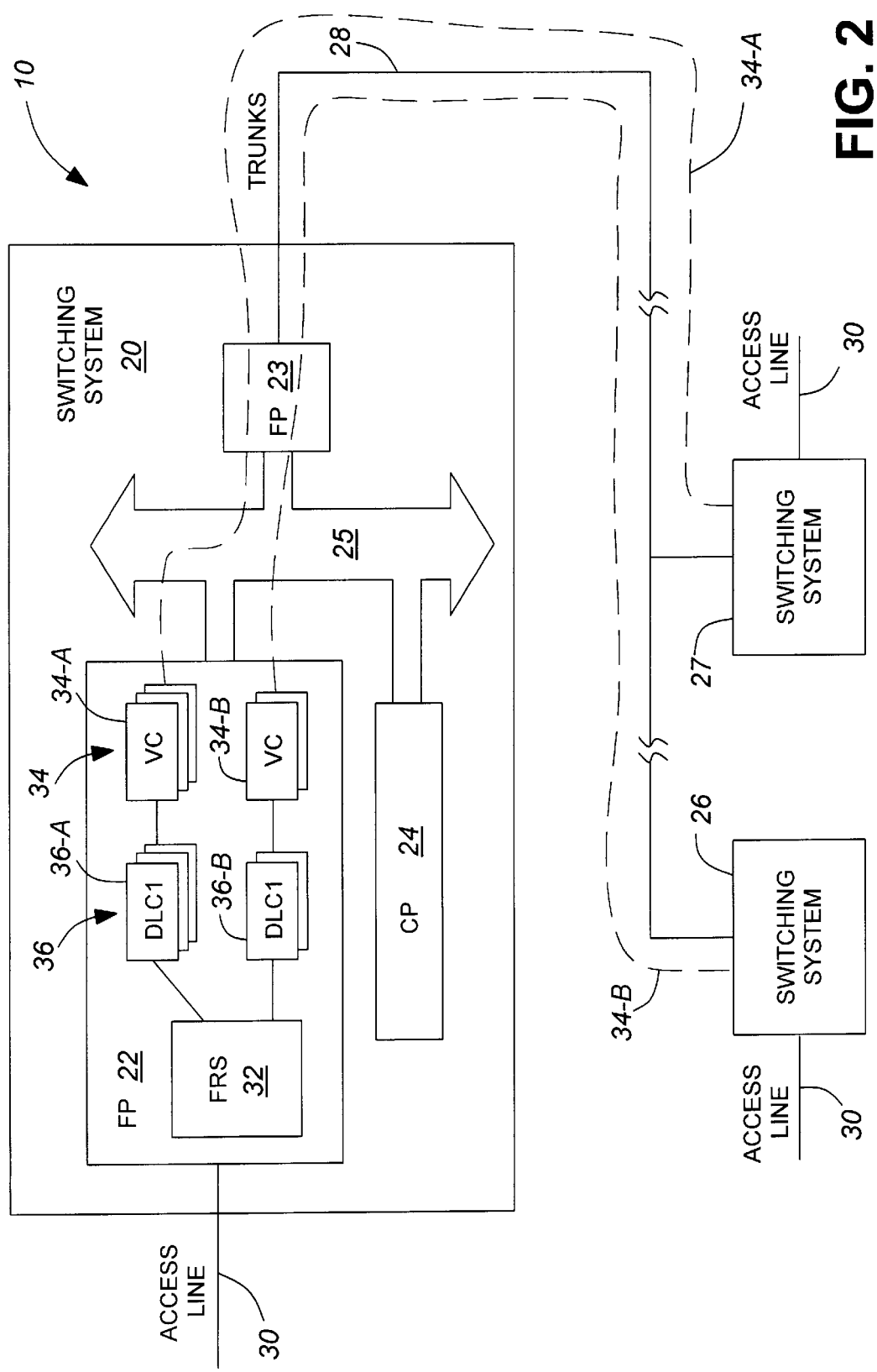
FIG. 2 is a schematic representation of a data communications switching system.

Referring to FIG. 2, illustrated is a particular configuration of a data network 10 including a switching system 20 which, in general, is a well known functional platform in data communications and which, in this particular instance, represents a configuration of Nortel's Magellan Passport product wherein the present invention is preferably embodied. The Passport based switching system 20 includes a plurality of functional processors (FPs) 22, 23 and a control processor (CP) 24 which are communicatively coupled through a backplane bus 25, via which data is exchanged therebetween. Depicted are two further switching systems 26, 27 which may communicate with the switching system 20 through trunks 28 and perhaps other network nodes (not shown). The FPs 22 and CP 24 and the switching system 20 in general, as well as the two switching systems 26, 27 characterise respective nodes 12 of data network 10 shown in FIG. 1.

The CP 24 provides control and management of the overall switching system 20 and its individual FPs 22, 23, and performs memory-intensive, non real-time tasks such as routing table maintenance. The CP 24 also provides system timing for all the processors (e.g., FPs 22, 23) connected to the backplane bus 25, to ensure synchronous bus operation.

The FPs provide communication physical interfaces for the trunks 28, shown connected to FP 23, or access services over respective lines 30, shown connected to FP 22, and perform the real-time processing, packet routing, and protocol handling associated with the interfaces. Although a single trunk 28 or access line 30 is shown connected to each of the FPs 22 and 23, it is noted that a plurality of trunks or access lines may be connected thereto.

A frame relay service (FRS) 32 is an example an access service that is executed by the FP 22. The FRS 32 may be implemented by a software process and respective instances of the FRS 32 exist for each access line 30 connected to that FP 22. Functions of the FRS 32 include controlling activation of a plurality of virtual circuits (VCs) 34, which are well known entities in data communications, between the switching system 20 and other network nodes such as switching systems 27 and 28 which also are provisioned with respective access lines 30.

The VCs 34 are constituted by respective software process instances within the FP 22 and depicted external thereof, the predetermined paths of the VCs 34 through the network 10 are represented by broken lines. Individual terminations for each of the plurality of VCs 34 at the switching system 20 are identified by respective data link connection identifiers (DLCIs) 36. The DLCIs 36 may also be implemented by respective instances of a software process executed by the FP 22, wherein the DLCI processes have a one-for-one correspondence with the VC processes.

For illustration, the FRS 32 of the FP 22 in FIG. 2 maintains the plurality of VCs 34 and DLCIs 36 which essentially are partitioned into two groups, the first group having VCs 34-A and DLCIs 36-A whereby multiple virtual circuit are established between the switching system 20 and the switching system 27, and the second group having VCs 34-B and DLCIs 36-B whereby multiple virtual circuit are established between the switching system 20 and the switching system 28.

Figure 3:
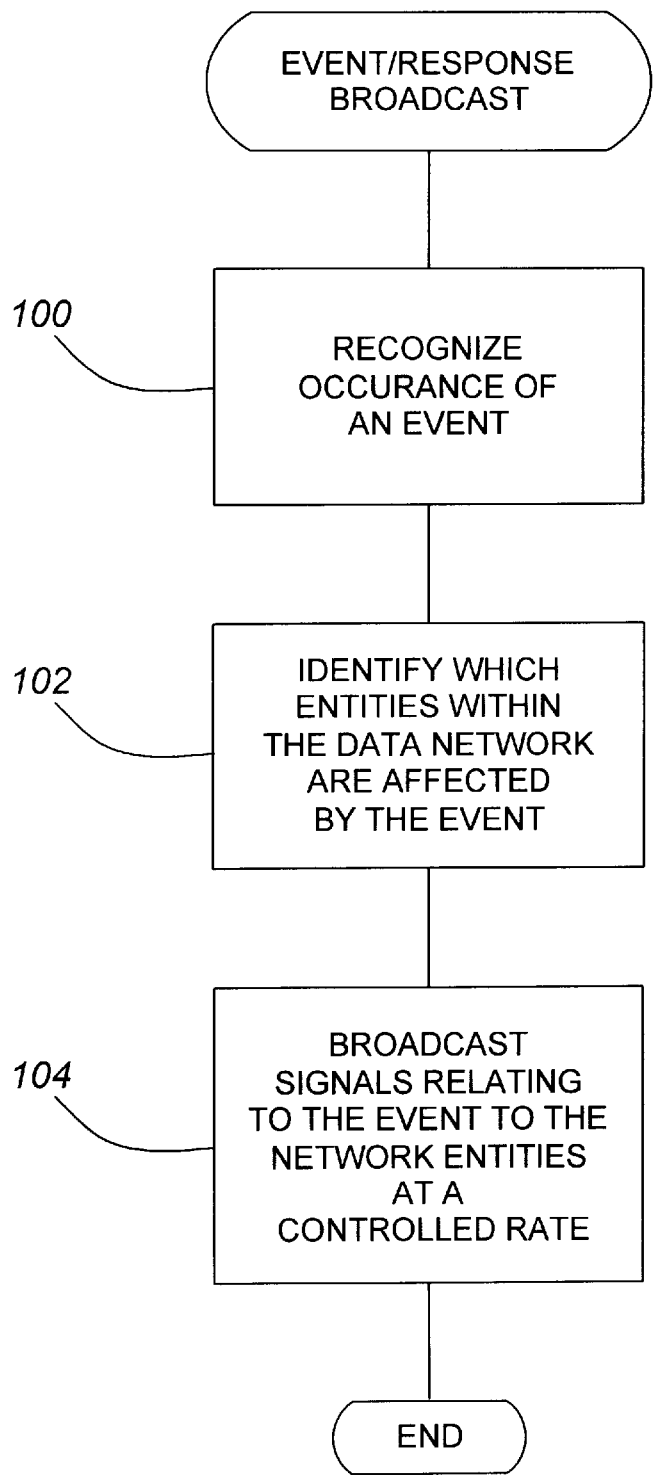
FIG. 3 is a flow chart depicting a broadcast slowdown process.

In operation of the switching system 20, the FPs 22, 23 and CP 24 characterizing processor nodes within the data network 10 perform supervisory activities which can entail broadcasting signals (e.g. messages) related to an event from that node to network entities which are affected by the event. The network entities include physical entities such as the switching systems 27, 28 and other network nodes, and virtual entities such as the DLCIs 36 and VCs 34 which may exist within the same node effecting the broadcast. FIG. 3 illustrates a process, in accordance with the present invention, manifesting an event/response broadcast at a network node. A broadcast is generally defined by generation of many events based on occurrence of a single event.

The process, at step 100, begins by recognizing an occurrence of an event at a network node, which event typically results from activity external of the node and affects many network entities. Examples of events include a node powering up or resetting, access lines becoming operational, previously functioning access lines becoming non-operational, and the like.

At step 102, the node then determines or identifies entities within the data network which may be directly affected by the recognized event occurrence. Network entities may exist in one or more network nodes and include, for example, VCs and DLCIs.

Lastly, at step 104, the node broadcasts to the affected network entities individual appropriately constructed messages or signals relating to the event, at a controlled rate. The messages being sent to the affected entities constitute a further event to those entities. The broadcast involves a cycle of broadcasting to one or more of the affected entities (preferably a small number thereof) and delaying at least a predetermined period of time, which cycle is repeated until all the affected entities have been informed. The broadcast in response to the recognized event is thereby effected at the controlled rate which preferably is no faster than a predetermined maximum rate.

Turning back to FIG. 2, as an exemplary application of the above process, the numerous network entities may be VCs 34 of a particular FP 22 (or their equivalent in other communications standards). Current Passport scaling, for example, may include over 5,000 VC's per FP and over 60,000 VC's per shelf in the Passport switching system 20.

VC 34 activities are directed by supervisors, in this case the FRS 32. No VC 34 activities occurs until the FRS 32 triggers some event or the node at the remote end of the VC triggers an event. For instance, an event that may trigger activation of VCs is the access line 30 becoming operational which is detected by the FRS 32.

According to the prior art systems, activation of the two groups of VCs 34 comprises the FRS 32 broadcasting activation signals at an uncontrolled rate, typically as fast as possible, to the DLCIs 36-A and 36-B which in turn provided activation signals to their corresponding processes for VCs 34-A and 34-B. In response, the VCs 34-A send respective activation messages to the switching system 27 and the VCs 34-B send respective activation messages to the switching system 26, which systems 26 and 27 may be overloaded by the number of messages and the rate at which the messages arrive thereby causing failure of those network nodes. Moreover, the VC 34 processes and the DLCI 36 processes, which operate autonomously with respect to the FRS 32, also may not be capable of processing the activation signals broadcast from the FRS 32 resulting in failure of the FP 22.

By slowing down the rate that the FRS 32 process triggers the VC events, effective slowing of the rate that VC's are activated through the entire network is accomplished. The process of the FRS 32 activating its VC entities is referred to herein as a broadcast slowdown which is done on an individual FP basis. A FP 22 will activate its VCs 34 at a rate which is no higher than a set rate. For illustration, to activate the VCs 34 corresponding to its DLCIs 36, the FRS 22 will broadcast the activation event to n DLCIs 36, wherein n is one or more, and after delaying a predetermined amount of time, broadcast to the next n DLCIs. This cycle is repeated until the message broadcast to all DLCIs 36-A and 36-B has been completed.

A C++ program fragment "continueBroadcast" that implements the broadcast slowdown process in a FP 22 network node is illustrated in FIG. 4. It is noted that each FRS in an FP 22 exists as a separate process that calls its own copy of continueBroadcast with its control data. The exception is the external number frsContBroadcast_g. There is exactly one such number in each FP.

frsContBroadcast_g is used to keep track of number of FRS processes that are broadcasting at the same time. Prior to entry to continueBroadcast, frsContBrodcast_g is incremented by one. Note that when the continueBroadcast being executed by a particular FRS terminates upon completion of the broadcast, frsContBroadcast_g is decremented by 1. In this manner, frsContBroadcast_g keeps track of number of FRS processes that are broadcasting at the same time.

When continueBroadcast is first called, since this could happen at any time, variable "bcnt" is set to a low number to prevent an initial burst from being too high. In this example, bcnt is set to 0, meaning on first entry to continueBroadcast no DLCIs are broadcast to. This will mean a slower broadcast rate for some pathological conditions. If needed bcnt may be set to 1 or 2 here to produce an initial burst of controlled size, in return for faster completion. This burst is dependent on the number of FRS's configured per FP. For example if the maximum number of FRS's configured for an FP is 100, and bcnt is set to 2, then there is a chance of a burst of 200 VC activities (or a tidal wave of size 200), in worst case circumstances.

At the end of continueBroadcast, the FRS process is delayed by (brate*frsContBroadcast_g) milliseconds. The delay timer contBroadcastTimer is a feature that allows the FRS process to delay by at least (brate*frsContBroadcast_g) milliseconds before resuming. Such timers are typically provided in conventional operating systems.

As the amount of delay is multiplied by frsContBroadcast_g, and after the initial block, frsBroadcastRerunLimit_c DLCIs are broadcasted to before doing another delay, this simple code guarantees that DLCIs will be broadcasted to in a rate that is less than frsBroadcastRerunLimit_c DLCIs for every brate milliseconds.

It should be understood that the names referenced herein are specific to the particular implementation being described. However, this algorithm may be used for any system that has delay timers, and which run different Frame Relay Processes that supervise DLCIs as separate independent processes. Variations may be required if a network node has different architectures, but as long as each network node (a) uses a delay timer set at a predetermined rate and (b) sends a predetermined number of broadcasts with each trigger of a delay timer, then broadcasting to VC's at a predetermined maximum rate is accomplished.

For clarity, if brate above is 300 milliseconds, and frsBroadcastRerunLimit_c is 10, then broadcast to VC's will go at no faster than 10 DLCIs every 300 milliseconds, or 1000 DLCIs every 30 seconds. Actual broadcast rate of this may be slower due to round-off when the FRS reaches the end of its list of DLCIs.

Slowest Broadcast Rate is different due to roundoff conditions. For bcnt above set to 0 on initial entry, and an FP with 100 FRS's and with 1 DLCI on 99 of them, and 901 on the other one, the total rate would be (a worst case scenario), total broadcast time will take:

99×300 milliseconds=29700 milliseconds+901/10
=90*300 milliseconds=27000 milliseconds=56700
milliseconds or about 57 seconds.

Hence, in accordance with the present invention, slowing down the activation to a fixed rate, without any monitoring of network activity, of numerous network entities in a large data network is a valuable method to enhance the stability of the large data networks, by preventing the generation of tidal waves. The above description shows an implementation of the idea in a particular operating system, mainly for the purpose of illustrating what the fixed rate activating means. The illustrated way that fixed rate is achieved is not important, except that the usage of the delay timer is one alternative to achieve this.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

I claim:

1. In a data communications network, a method of broadcasting signals from one node to a plurality of nodes comprising alternate steps of, at the one node:
   broadcasting the signals to a portion of the plurality of nodes; and
   delaying a predetermined time interval;
   whereby the alternate steps are repeated until the signals have been broadcast to all of the plurality of nodes, such that the broadcasting of signals is effected at a controlled rate which is no faster than a predetermined maximum rate.

2. A method as claimed 1, wherein the predetermined time interval is determined by the triggering of a delay timer that has been set to a predetermined rate.

3. A method as claimed in claim 2, wherein the portion is one or more nodes of the plurality of nodes, per repetition of the broadcast step.

4. In a data communications network, a method of broadcasting signals comprising the steps of:
   recognizing occurrence of an event at a node;
   determining network entities which are effected by the recognized event; and
   broadcasting, by the node, related event signals corresponding to the recognized event to the affected network entities substantially at a controlled rate which is no faster than a predetermined maximum rate, wherein the step of broadcasting the related event signals includes alternate steps of sending the related event signals to a number of the affected entities and delaying a time interval, the alternate steps being repeated till the related event signals have been broadcast to all of the affected network entities.

5. A method as claimed 4, wherein the time interval is determined by the triggering of a delay timer that has been set to a predetermined rate.

6. A method as claimed in claim 5, wherein the number is one or more of the affected entities.

7. A method as claimed in claim 6, wherein the recognized event is an access line being operational, the affected network entities are virtual circuits and the related event signals are to activate the virtual circuits which are associated with the access line.

8. In a data communications network, a system of broadcasting signals from one node to a plurality of nodes comprising:

means for broadcasting the signals to a portion of the plurality of nodes; and means for delaying a predetermined time interval;

whereby the means for broadcasting and the means for delaying operate alternately and repeatedly until the signals have been broadcast to all of the plurality of nodes, such that the broadcasting of signals is effected at a controlled rate which is no faster than a predetermined maximum rate.

9. A system as claimed in claim 8, wherein the means for delaying further includes a delay timer, set to a predetermined rate, for triggering the predetermined time interval.

10. A system as claimed in claim 9, wherein the portion is one or more nodes of the plurality of nodes, per operation of the means for broadcasting.

11. In a data communications network, a system for broadcasting signals comprising:

means for recognizing occurrence of an event at a node;

means for determining network entities which are affected by the recognized event; and means for broadcasting, by the node, related event signals corresponding to the recognized event to the affected network entities substantially at a controlled rate which is no faster than a predetermined maximum rate, wherein the means for broadcasting the related event signals includes means for sending the related event signals to a number of the affected entities and means for delaying a time interval, whereby the means for broadcasting and the means for delaying operate alternately and repeatedly till the related event signals have been broadcast to all of the affected network entities.

12. A system as claimed in claim 11, wherein the means for delaying further includes a delay timer, set to a predetermined rate, for triggering the time interval.

13. A system as claimed in claim 12, wherein the number is one or more of the affected entities.

14. A system as claimed in claim 13, wherein the recognized event is an access line being operational, the affected network entities are virtual circuits and the related event signals are to activate the virtual circuits which are associated with the access line.

* * * * *